United States Patent
Misra et al.

[11] Patent Number: 6,134,971
[45] Date of Patent: *Oct. 24, 2000

[54] STRESS INDUCED VOLTAGE FLUCTUATION FOR MEASURING STRESS AND STRAIN IN MATERIALS

[75] Inventors: Anupam Misra; James R. Gaines; Richard Rocheleau, all of Honolulu, Hi.; Steven Song, San Jose, Calif.

[73] Assignee: University of Hawaii, Honolulu, Hi.

[*] Notice: This patent issued on a continued prosecution application filed under 37 CFR 1.53(d), and is subject to the twenty year patent term provisions of 35 U.S.C. 154(a)(2).

[21] Appl. No.: 09/141,365

[22] Filed: Aug. 27, 1998

[51] Int. Cl.⁷ ....................................................... G01B 7/16
[52] U.S. Cl. ............................................... 73/777; 73/811
[58] Field of Search .............................. 73/763, 777, 778, 73/779, 780, 811, 769

[56] References Cited

U.S. PATENT DOCUMENTS

| | | |
|---|---|---|
| 3,434,343 | 3/1969 | Senour . |
| 3,965,429 | 6/1976 | Roberts, III . |
| 4,630,491 | 12/1986 | Kitagawa et al. ................. 73/862.622 |
| 4,658,233 | 4/1987 | Uchida et al. ................ 338/5 |
| 4,747,456 | 5/1988 | Kitagawa et al. ...................... 177/211 |
| 4,777,826 | 10/1988 | Rud, Jr. et al. ........................... 73/708 |
| 4,782,705 | 11/1988 | Hoffmann et al. . |
| 4,884,453 | 12/1989 | Hoffmann et al. . |
| 5,317,920 | 6/1994 | Kremidas . |
| 5,589,770 | 12/1996 | Saitou ..................................... 324/209 |

OTHER PUBLICATIONS

Misra et. al. A New Non–Destructive Characterization Technique (l/f Noise) For Detecting Fatigue In Metal Hydrogen Containers, Hydrgen Energy Progress X—Proceedings of the 10th World Hydrogen Energy Conference, Jun. 20–24, 1994, pp. 215–223, vol. I.

D.J. Bergman, "Electrical Transport Properties Near A Classical Conductivity or Percolation Threshold", Physica A 157 (1989) pp. 72–88.

Y. Song et al., "1/f noise power measurements on $Tl_2Ba_2Ca_{n-1}Cu_nO_{4+2n}$ (n=2 and 3)", Physica C 172 (1990) pp. 1–12.

P. Dutta et al., "Low–frequency fluctuations in solids:1/f noise", Reviews of Modern Physics, vol. 53, No. 3, Jul. 1981, pp. 497–516.

*Primary Examiner*—Max Noori
*Attorney, Agent, or Firm*—Watts, Hoffmann, Fisher & Heinke Co.

[57] ABSTRACT

The present invention is a novel electronic technique that detects stress/strain in any conductive or semiconductive material. The technique is based on passing a current through the material of interest and analyzing the low frequency voltage fluctuation. The voltage fluctuation is very sensitive to the amount of stress present in the sample. The voltage fluctuation is a result of interactions between the imposed current and material itself. The technique is many orders of magnitude more sensitive than any present method. The technique is suitable for sensitive measurements without a strain gauge. The technique is not limited by sample size, and provides a simple, fast, nondestructive and on-site evaluation of stress/strain in a material.

33 Claims, 14 Drawing Sheets

CONTACT PADS FOR FOUR-PROBE MEASUREMENTS

STRESS INDUCED VOLTAGE FLUCTUATION FOR MEASURING STRESS AND STRAIN IN MATERIALS

BACKGROUND OF THE INVENTION

The current technology for measurement of stress and strain is based on installing a strain gauge in a material of interest or between components. The change in gauge property is then monitored. The most widely used strain gauge technology is based on the detection of a change in the gauge property, usually the electrical resistance (or voltage) of the conducting sensor element. The change in electrical resistivity of a metallic sensor under stress is usually below 0.1%, which limits the sensitivity of the strain gauges using metallic sensors. The gauge factor is approximately two (2) for gauges using metal sensing elements. The substitution of semiconducting materials for sensing elements may yield gauge factors of 150 to 200 due to the larger change in their specific resistivity under stress in comparison to that of metallic conductors.

Several optical techniques utilizing the laser interference technique have also been used to measure strain/stress in selected material without the use of a strain gauge. However, those techniques may only detect changes in the strain/stress and are not suitable for the absolute measurement of strain/stress. Hence, those techniques may not measure strain/stress in materials that are part of a system and are already under stress in their normal operational mode (such as various airplane parts).

Another optical technique uses the fringe patterns created by the deformation as light passes through a transparent photoelastic material. That technique is applicable to transparent materials and may be applied to the opaque structure provided that a transparent photoelastic plastic coating is applied before any stress is applied to the material. That technique may not be used to detect stress in components that have already been assembled or are already under stress. As with other currently available technologies, the sensor (the transparent coating) must be part of the system and must be applied the system comes under stress.

Determination of stress in thin films is an important issue for the semiconductor and IC industries. Stress is normally present in thin films due to a number of reasons: deposition conditions, substrate mismatch, shrinkage of voids, phase transformations, epitaxial forces, diffusion of molecules, and relaxation mechanisms. High levels of stress in a sample can cause the film to crack or peel, which normally results in the failure of the electronic device. Hence, an in situ determination of stress during the film growth is highly desirable by the industry in order to control the film properties. Unfortunately, due to the complexity of presently existing stress detection techniques, no convenient method to use stress detection system has been developed.

A popular method for determining stress in unpatterned films is the measurement of the curvature of the film by means of two laser beams reflecting nearly perpendicularly off the substrate. A position sensitive light sensor is used to determine the angle of reflection. The stress is then calculated, using Stoney's equation, from the values of film curvatures, Young's modulus and Poisson's ratio of the substrate, and thicknesses of the substrate and the film. The in situ measurement of film thickness during growth process is done by means of interferometry. That method is very expensive and time consuming and requires an optically flat substrate which limits its practical application. The complexity of that technique has inspired others to search for a practical stress sensor.

A thin film ruby on sapphire sensor that utilizes the piezo spectroscopic effect has also been used for stress determination. The frequency of R lines from $Cr^{+3}$ dopants in sapphire shifts to lower wavenumbers in the presence of stress on the sample. A frequency shift of only 0.4 $cm^{-1}$ occurs for a stress level of 150 MPa. Infrared thermal imaging for detecting vibrational stresses has also been used. The infrared radiation from the sample shows a change of up to 0.5% in optical intensity modulation index when the sample is subjected to transient stress.

A more practical approach for the determination of stress is the use of piezoelectric and piezoresistive gauges. The piezoelectric polyvinylidene fluoride (PVDF) stress gauge produces a charge when subjected to stress. There are two types of piezoresistive gauges: the carbon gauge and the metal foil (Yb, Mn) gauge. In both types, the resistance of the gauge changes with applied stress. Those traditional stress gauges, which rely on the measurements of change in gauge voltage or resistance, however, are less sensitive due to small changes in the gauge properties as a function of stress.

Other measuring techniques include x-ray diffraction and micro-Raman, which are not suitable for field use and are limited in their scope. Optical techniques, such as laser interference and x-ray diffraction, measure only the change in the strain/stress and are not suitable for measuring the absolute stress/strain. The initial data corresponding to zero stress/strain in the sample is needed for comparative purposes. The size of those techniques is also a concern for routine field work.

There are two serious limitations to the current technologies. One is that the strain gauge must be built as part of the system during assembly in order to monitor the gauge property of interest. Hence, strain or stress in an oil pipe or airplane part may only be detected if the strain gauge was installed as part of the system. It is usually extremely difficult to retrofit the strain gauges into an already assembled system. There is no current state of the art technique that can detect stress/strain in the field in materials that are not equipped with a gauge.

The second limitation is that knowledge of the strain gauge behavior without stress is required to determine the change in the gauge property. The latter requires careful mounting of a strain gauge in a system before assembly so that a correct value under zero stress level may be obtained. It is difficult, if not impossible, to measure stress values by attaching an external strain gauge to the material after it is already under stress.

SUMMARY OF THE INVENTION

The present invention provides a electronic technique that accurately measures stress/strain in a wide variety of conducting and semiconducting materials. The technique may be used with a strain gauge or by making measurements directly in the material or component of interest. The technique is based on passing a current through the material and analyzing the voltage noise spectra. A new type of electronic signal was observed while monitoring the fluctuations in sample voltage when the sample was put under stress/strain. The stress induced electronic signal was found to have a characteristic spectra that was very sensitive to the amount of stress in the sample.

That phenomenon has never been observed before and has the potential for developing a new area in science relating the mechanical properties of a material to its electronic behavior. That phenomenon has immediate application for building very sensitive stress sensors, strain gauges and is suitable for sensitive measurements of strain/stress without the help of a gauge. Presently, no theoretical explanation of the new phenomenon has been developed. The signal presumably originates from changes in modes of atomic, lattice vibrations and/or scattering processes that are sensitive to stress. The reproducibility of data was confirmed by making several- measurements over long periods of time on various samples.

The technique has applications in many areas of commercial interest. The technique may be applied to detect stress in various parts of the space shuttle, airplanes, tanks, oil pipe lines, cables, machines, electronic circuits, structures such as bridges, buildings, and transmission towers and various other objects that are currently under operation but are not equipped with strain gauges, or where greater sensitivity is required or desired. For new components currently being fabricated, the in situ measurement offers a much more accurate measurement and much greater sensitivity. The detection of stress and the resulting strain prior to major deformation may predict possible failure in those systems and may be used to closely monitor their service life.

The new technique provides the world's most sensitive stress sensor. The stress sensors are highly desirable in the thin film industry, petroleum industry, auto industry, aviation industry, geophysics, construction industry, and other areas of science where failure of a component depends on the amount of stress present. Other applicable areas include fields that concern corrosion, structural stress, strain gauges, hydrogen embrittlement, fatigue, etc. The stress/strain measurement technique may also be applied in research applications where in situ highly sensitive stress/strain measurements are desired, such as mechanics testing, stress corrosion, and materials testing. Another useful application is for in situ stress measurements for the thin film industry for characterization of integrated circuits and other electronic films. The technique may be used in the geophysics field, such as in developing sensitive earthquake detectors.

Measurement of the voltage fluctuations provides an extremely sensitive method of detecting the level of stress/strain in the material. The measurement technique may be applied to existing strain gauges by upgrading the electronics for signal processing without any modification to the sensor geometry or sensing material. Use of this technique improves the gauge factor of an existing electrical stain gauge with a metal sensor from its normal value of two to values greater than one million. The technique is also applicable to other materials, such as semiconductors, superconductors, and resistors, through which electrical current may flow. Stress measurements may be made directly in these materials, which may also be used to make sensitive strain gauges.

The present invention requires several electronic components, including an amplifier, transformer, spectrum analyzer and a computer. The system may be greatly simplified and the cost reduced if it is designed for analysis of a particular type of material (for example, stainless steel or aluminum) at a limited number of frequencies. If that is done, the spectrum analyzer, computer, amplifier and transformer may be replaced by a simple lock-in amplifier. The cost of such a portable unit is only several thousand dollars, depending on the desired complexity and accuracy. Alternatively, multiplexing, which allows one set of electronics to monitor several strain gauges simultaneously, provides a cost effective system. No present system measures strain with such sensitivity at any cost.

The new technique may use commercially available strain gauges as the sensor element, so reliability and robustness are not an issue. The technique is also capable of performing strain measurements using conventional resistance monitoring methods that utilize the same equipment. The technique has two additional advantages. It may be used on partially-damaged strain gauges that went through the inelastic region. Second, it allows for a wider range for stress detection, including levels above the yield stress of the sensor. The technique is simple, versatile, economical, fast, sensitive and nondestructive to the tested material and is not limited by sample size or complexity.

These and further and other objects and features of the invention are apparent in the disclosure, which includes the above and ongoing written specification, with the claims and the drawings.

DETAILED DESCRIPTION OF THE PREFERRED EMBODIMENTS

Figure 1:
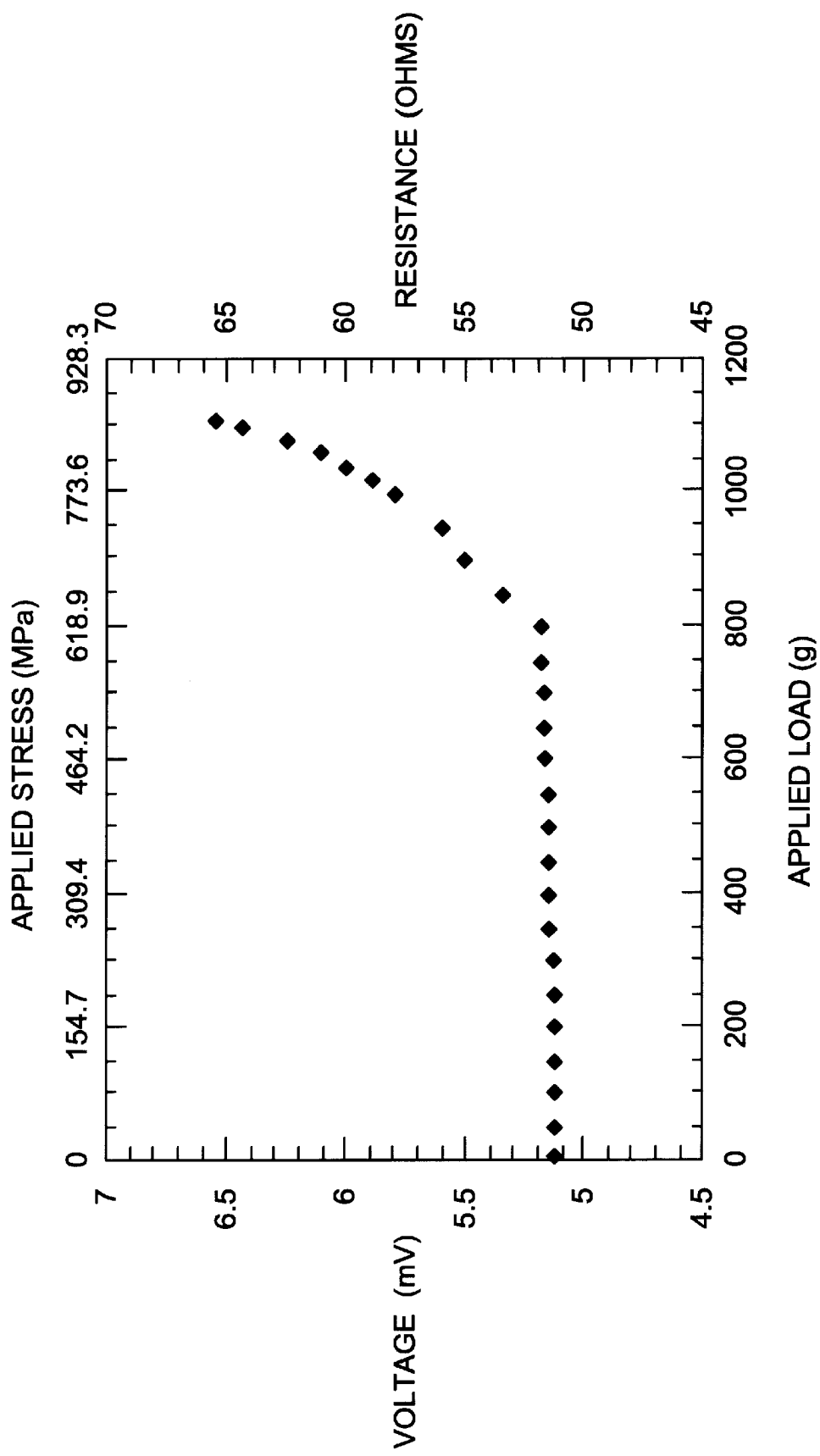
FIG. 1 is a graph of resistance vs. an applied stress for a NiCr wire sample.

Materials respond to stress by straining, that is, by a change in the geometry or dimensions of the sample. The resistance of an electrically conducting material changes when the material is strained. The change in electrical resistance may be due to a change in the specific resistance of the material or due to the change in sample geometry. That change in electrical resistance is the basis for transducers in commercial sensors designed to measure strain, stress, load, torque, pressure, force and acceleration.

The resistance of an electrically conducting material with uniform properties and cross section is given by $$R = \rho \frac{L}{A} \quad (1)$$

where
R=resistance of the material
ρ=resistivity of the material (an intrinsic property of the material)
L=length of the material
A=cross-sectional area For small changes in resistivity and/or geometry, the change in the resistance is obtained as $$\frac{dR}{R} = \frac{d\rho}{\rho} + \frac{dL}{L} - \frac{dA}{A} \quad (2)$$

For the simple case where a piece of material is subjected to force in only one direction (tensile stress), the material "stretches" in the direction of the stress and usually gets thinner in the transverse direction. Under those circumstances, the axial strain is defined as $$\varepsilon = \frac{dL}{L} \quad (3)$$

Poisson's ratio, the negative of the ratio of the inward strain to the original tensile strain, is given by $$v = \frac{\frac{dD}{D}}{\frac{dL}{L}} \quad (4)$$

The change in the characteristic transverse dimension of the conductor is dD.

Substituting equation (3) and (4) into (2), the change in resistance is related to the axial strain by the following equation $$\frac{dR}{R} = \frac{d\rho}{\rho} + \frac{dL}{L}(1 + 2v) \quad (5)$$

The sensitivity of a strain gauge is characterized by its gauge factor (F), defined as the ratio of relative change in the gauge property (in this example, resistance) to the strain (in this example, relative change in length).

$$F = \frac{\frac{dR}{R}}{\frac{dL}{L}} = 1 + 2v + \frac{\frac{d\rho}{\rho}}{\varepsilon} \quad (6)$$

Equation 6 indicates that the gauge factor (gauge sensitivity) is determined primarily by two factors: the change in the dimension of the conductor as expressed by the 1+2v term, and the ratio of the change in the specific resistance (resistivity) to the strain. The latter is known as the piezoresistive effect. For a sensor fabricated from metals, the contribution from the second term is very small. Hence, a metallic strain gauge shows a gauge factor of about 2 (since v=0.5 for most metals).

The gauge factor of some metallic alloys commonly used in commercial strain gauges is given below.

| Material | Composition | Gauge factor |
|---|---|---|
| Advance | Ni 45%, Cu 55% | 2.1 |
| Nichrome | Ni 80%, Cr 20% | 2.2 |
| Karma | Ni 74%, Cr 20%, Al 3%, Fe 3% | 2.0 |

Greater sensitivity, hence larger gauge factors, may be achieved by using materials that also exhibit a large change in the specific resistance as strain is induced in the material. Strain gauges based on semiconducting material may have gauge factors in the range of 150 to 175.

Using the novel techniques described in this disclosure, the sensitivity of commercial strain gauges using metal sensors may be increased such that their gauge factor is increased from their normal value of 2 to over 1,000,000 without any modification to the strain gauge itself. The same sensitivity may be achieved with measurements in the material or component itself. The new measurement technique is based on monitoring the voltage fluctuations in the conducting material serving as the sensor element. Even under conditions in which the specific resistance shows little measurable change, the voltage fluctuation on which the technique is based exhibits very large changes to the applied stress/strain.

The piezoresistive stress sensor is based on the measurement of resistance (or voltage) of the sensor as a function of stress. The strain measurements utilizing electrical resistance strain gauges are based on the measurement of current or voltage through the sensing material. FIG. 1 shows the results of the traditional method where the sample resistance is monitored as a function of applied stress for a 5 mil NiCr (nichrome) wire sample as the mass of a weight suspended from the wire is increased from 5 to 1100 grams. The voltage across the piece of NiCr wire was determined by 4-point measurement with a fixed current. Since the voltage was measured under a constant current, the change in resistance is directly proportional to the change in voltage. The experimental setup simply consisted of voltage measurements on the hanging wire with known suspended weights. The simplicity of the setup allows for calculating the applied stress from the known masses of the loads suspended from the wire. The values of the applied load are shown on the bottom x-axis, and the resultant stress values are on the top x-axis. The strain in the wire is directly proportional to the stress in the elastic region of the sample and is calculated using the value of the Young's modulus for the sample.

The data clearly show the elastic region corresponding to the linear behavior and inelastic region corresponding to the non-linear part of the sample. Under low loads (below 619 MPa or 800 g), the voltage across the wire changes linearly but increases only very slowly with increased load. At higher loads (above 619 MPa or 800 g), the voltage (hence, resistance) changes nonlinearly and exhibits a much greater sensitivity to changes in the load. The linear, low load conditions, correspond to the elastic region for the wire in which there is little change in the shape of the wire and no permanent deformation. At higher loads, corresponding to the inelastic region, the wire undergoes a rather significant and irreversible change in shape as the load is increased. The wire breaks around 851 MPa (load=1100 g).

The change in voltage (or sample resistance) is very insensitive to changes in stress in the elastic region of the sample where little strain is induced. As an example, the response to background ratio is only 0.00078 for applied stress of 116 MPa (load=150 g). That is calculated as shown:

$$\frac{\text{Response}}{\text{Background}} = \frac{V(\text{stress} = 116Mpa) - V(\text{stress} = 0Mpa)}{V(\text{stress} = 0Mpa)}$$

$$= \frac{5.124\text{mV} - 5.120\text{mV}}{5.120\text{mV}} = 0.00078$$

Assuming a gauge factor (F) of 2.2, as has been reported for nichrome, the relative change in the resistance (dR/R) is easily converted to axial strain using the first equality given in Equation (6).

Figure 2:
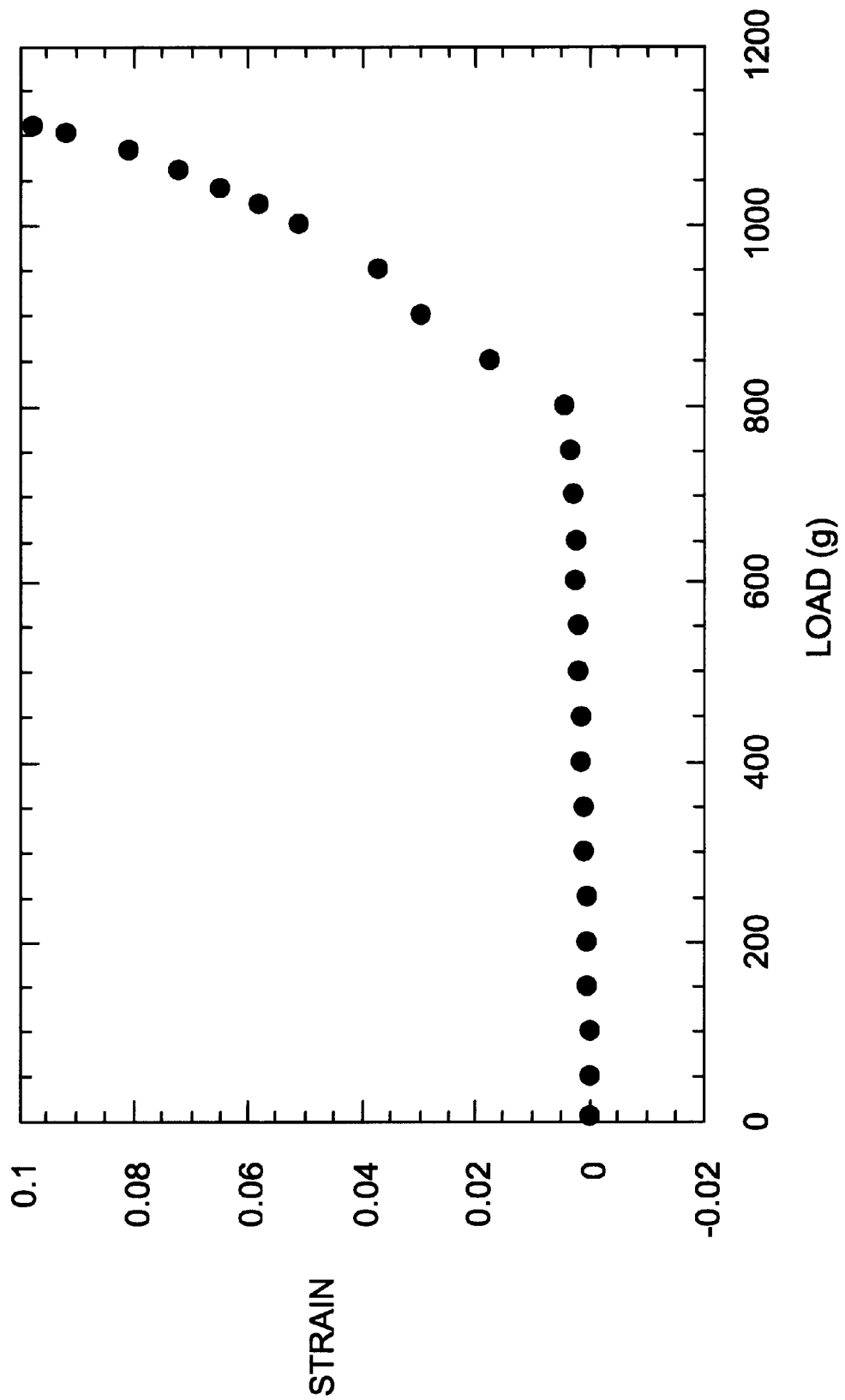
FIG. 2 is graph of strain vs. an applied load of 0 to 1100 grams for NiCr wire sample.

The relative change in resistance of 0.00078 corresponds to a strain value of 0.000355 (=0.00078/2.2). FIG. 2 shows the calculated values of strain as a function of applied load assuming a constant gauge factor of 2.2. The plot shows that in the elastic region the strain in the sample is below 0.005, or 0.5%. In the inelastic region, the maximum strain just before the wire breaks is about 0.1, or 10%. The small changes in strain, particularly in the elastic region, show the importance of developing strain gauges with greatly improved sensitivity for many applications.

An improvement in sensitivity is possible with suitable choice of material and geometry of the sensor. A response to background ratio of up to 0.06 for stress levels of 150 MPa using various piezoelectric and piezoresistive stress sensors has been found.

A new sensitive way to detect stress/strain in the samples is to monitor the low frequency voltage fluctuations instead of the voltage across the sample. It is important to note that those voltage fluctuations are a result of the interactions between the imposed current and the material itself, not due to fluctuations of the applied current or voltage.

Figure 3A:
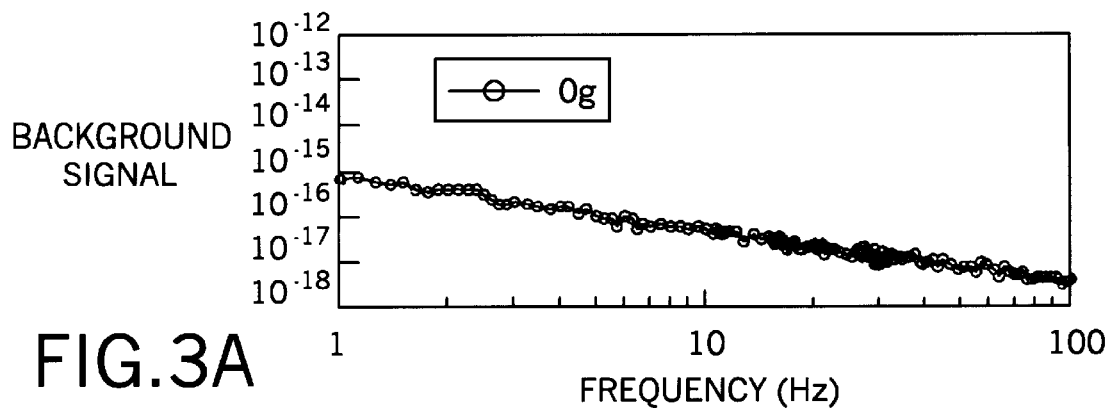
FIGS. 3A, 3B and 3C are graphs of voltage fluctuations of NiCr wire showing the background signal vs. frequency for zero applied stress, stress-induced signal vs. frequency for an applied load of 150 g, and the response to background ratio vs. frequency, respectively.
Figure 3B:
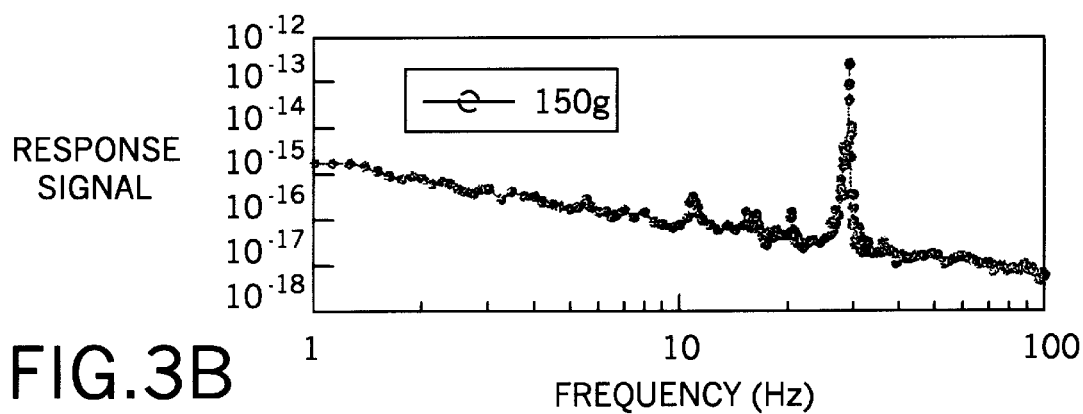
Figure 3C:
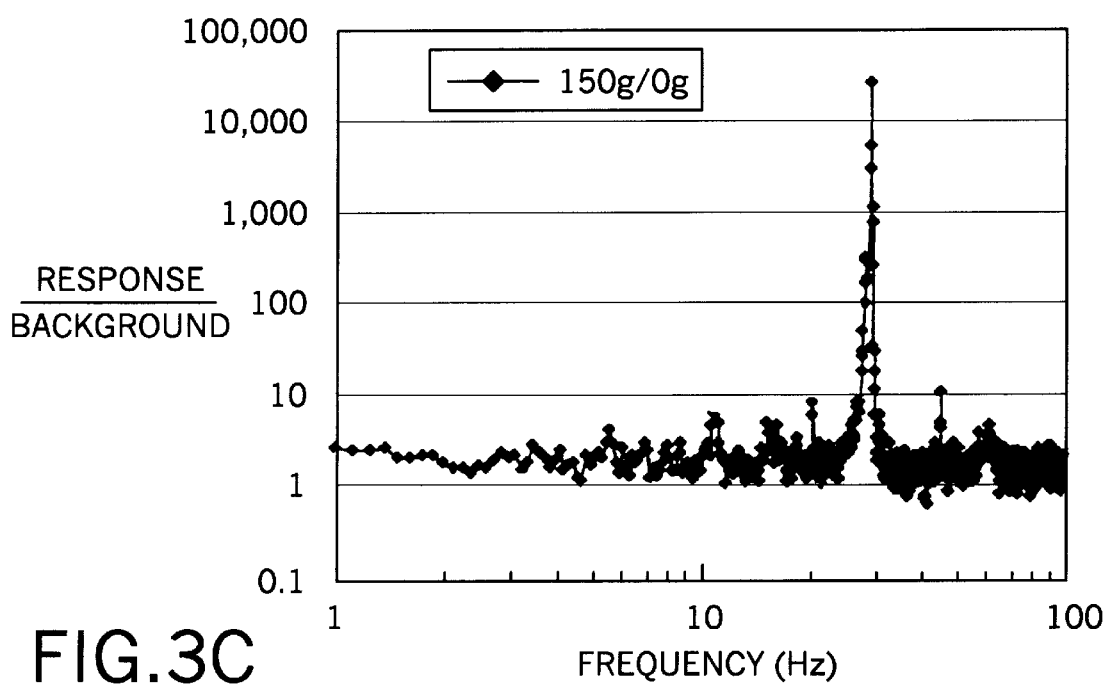
Figure 4A:
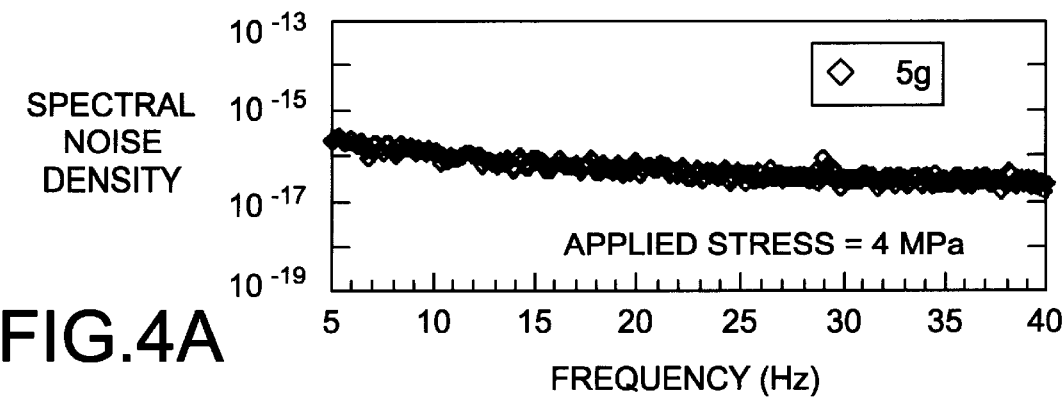
FIGS. 4A, 4B, 4C and 4D are graphs of spectral noise density vs. frequency for applied loads of 5, 250, 500 and 1000 grams, respectively.
Figure 4B:
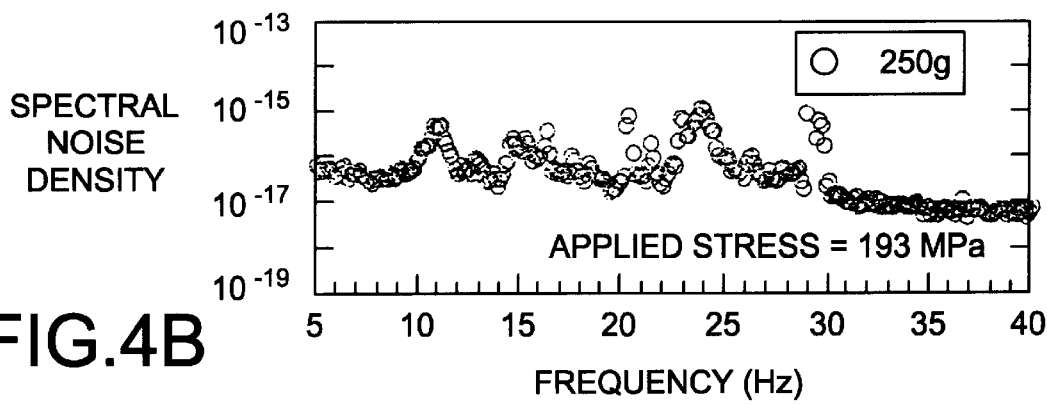
Figure 4C:
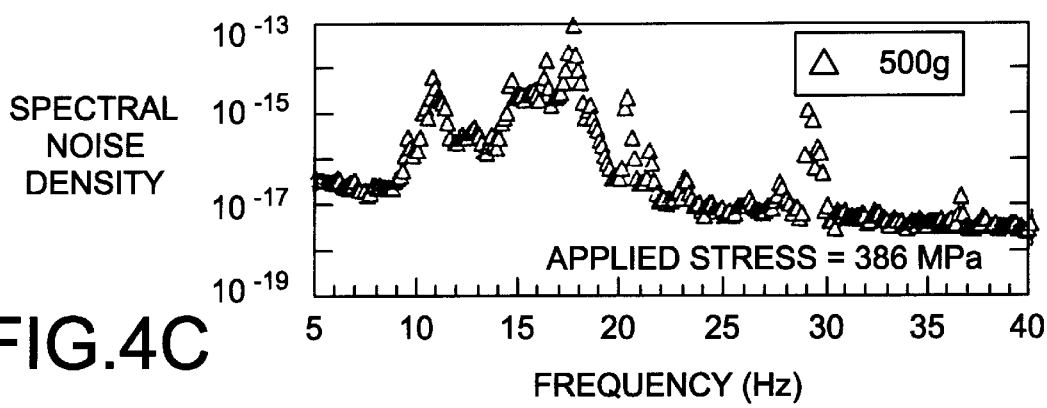
Figure 4D:
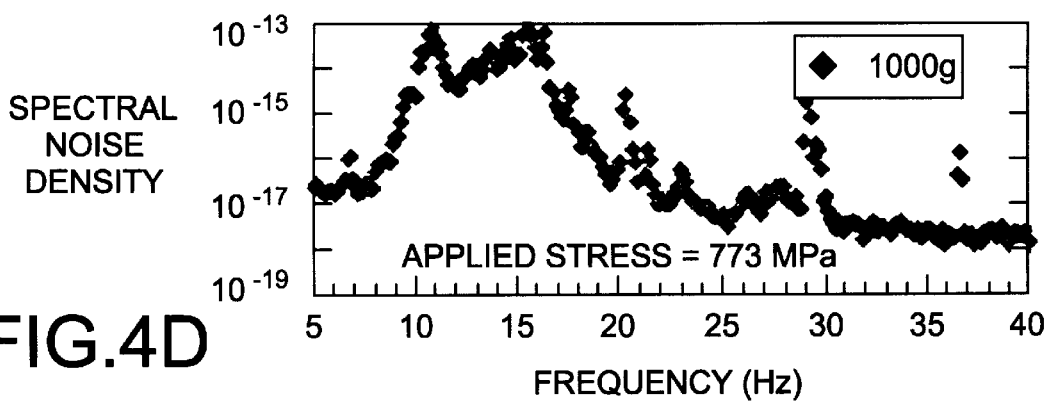

In FIGS. 3A, 3B and 3C, the voltage fluctuation (also known as noise spectral density) is plotted as a function of frequency for the same type and geometry of NiCr wire with and without a 150 g weight attached. Both, the response signal corresponding to applied stress of 116 MPa (load=150 g) and the background noise corresponding to zero applied stress, are shown on the same plot. For the stress induced electronic peak at 29 Hz, the response to background ratio is more than 26,000:1. That is calculated as:

$$\frac{\text{Response}}{\text{Background}} = \frac{\text{Signal(stress} = 116\text{Mpa}) - \text{Background(stress} = 0\text{Mpa})}{\text{Background(stress} = 0\text{Mpa})}$$

$$= \frac{(2.4e^{-13}) - (9.24e^{-18})}{9.24e^{-18}} = 25,973.026$$

FIG. 3A shows the voltage fluctuations with no applied stress (strain=0). That is the background against which the response signal is to be compared. FIG. 3B shows the voltage fluctuations with an applied stress of 116 MPa (load=150 g) corresponding to strain of 0.000355. FIG. 3C shows the ratio of the noise spectral density (voltage fluctuation) in the NiCr wire with a load of 150 g to that of the background. At a frequency around 29 Hz, the signal to background ratio is approximately 26,000:1, more than $10^7$ times as sensitive to the imposed stress/strain than was the bulk resistance measurement used in conventional strain gauges. To contrast, ratio of the change in bulk resistance to the initial value (background), shown in FIG. 1, was only 0.00078 for the same amount of applied stress.

Clearly, the new technique is very sensitive in comparison to the previously discussed resistance measurement technique. The plot shown also corresponds to cases where stress is well within the elastic region of the sample.

An important characteristic of any stress/strain detection method is its ability to measure stress/strain over a wide range of values. FIGS. 4A, 4B, 4C and 4D show the voltage fluctuations in the NiCr wire for frequencies between 5 and 40 Hz for loads between 5 and 1000 g. Even at the extremely low load of 5 g, voltage fluctuations above the background are seen at several frequencies, most notably at 29 Hz. At higher loads, the signal at 29 Hz becomes very large as do the stress induced signals at a number of other frequencies. Systematic changes in the spectra, including peak areas, peak heights and line widths of the various peaks, are clearly evident as the applied stress is changed. Peaks at different frequencies behave differently as the stress/strain is increased. As an example, the peak at 10.75 Hz increases monotonically throughout the range as the stress level is increased to near the breaking point.

Figure 5:
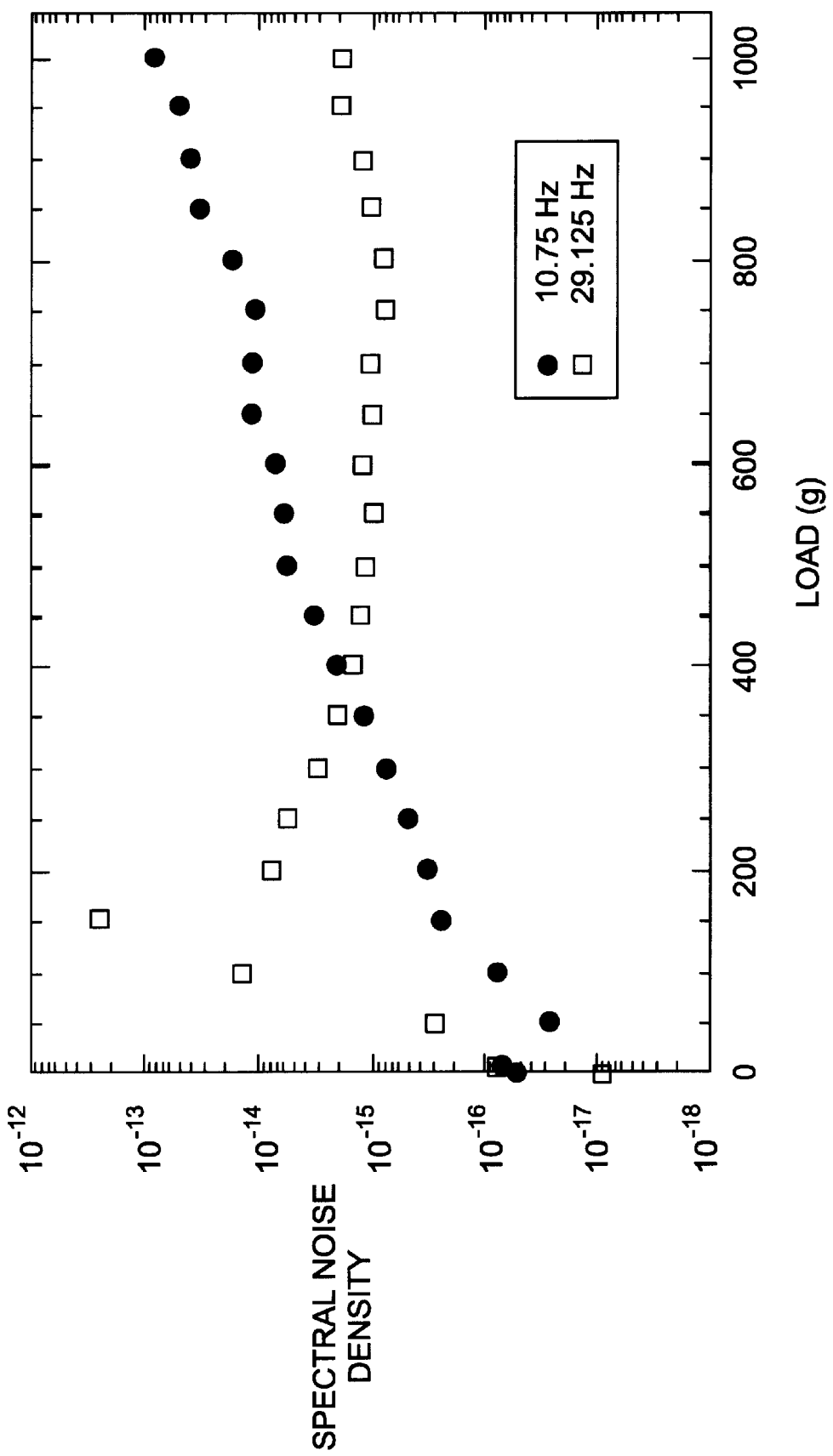
FIG. 5 is a graph of the spectral noise density vs. applied load for frequencies of 10.75 and 29.125 Hz.

Other peaks, such as that at 29.12 Hz, reach a maximum at relatively low stresses and then decrease with further stress loading. That behavior is shown in FIG. 5, where the noise signal for those two frequencies are plotted as a function of applied load. By analysis of several frequencies with different characteristics, it is possible to measure stress/strain very precisely, to have an internal check of the measurements and to gain additional information about the state of the material.

The measurement of voltage fluctuation provides a much higher sensitivity and gauge factor than direct voltage/resistance measurements. The gauge factor is found to be a function of both stress/strain and the frequency of the signal used for analysis.

Figure 6:
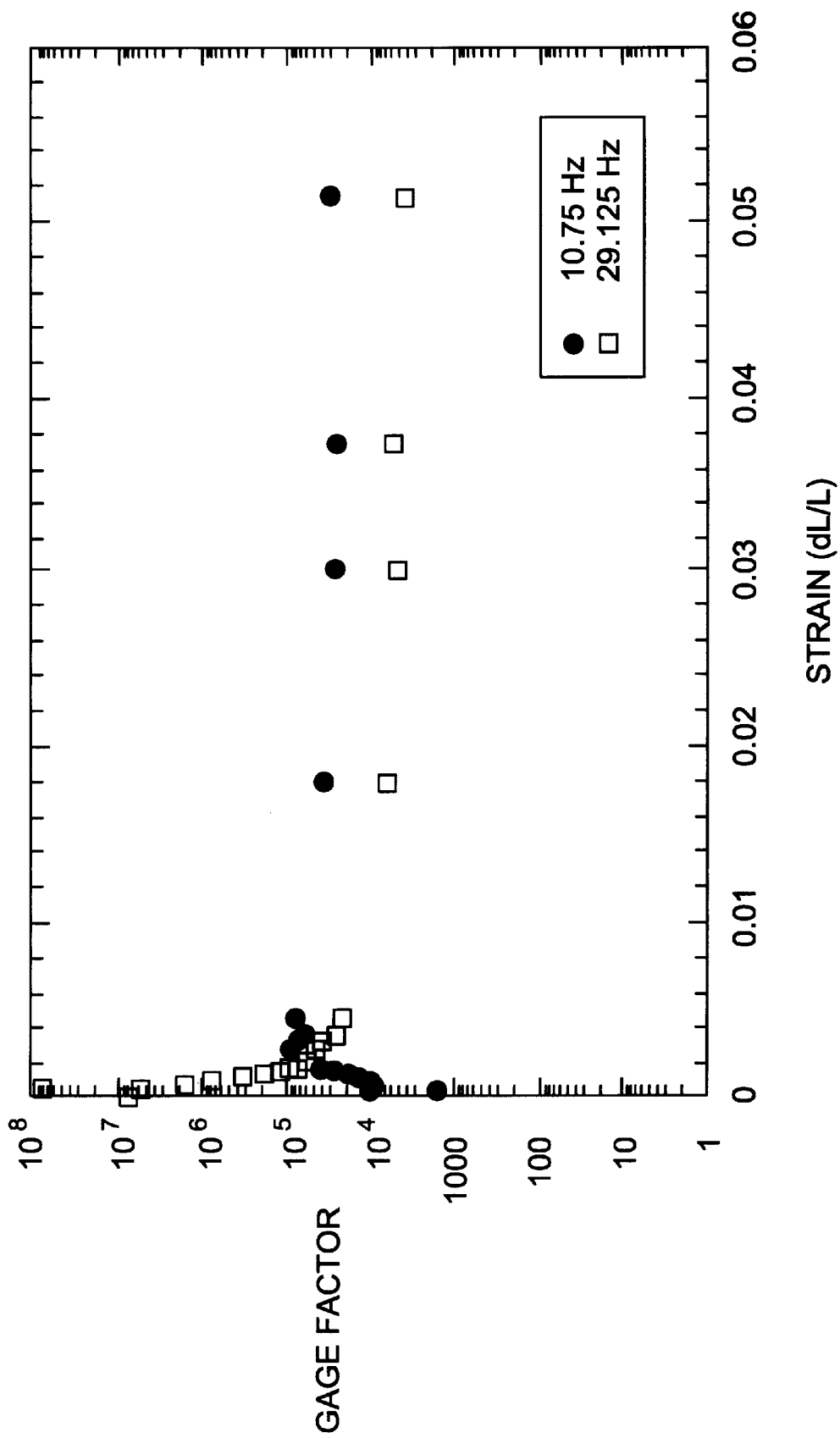
FIG. 6 is a graph of gauge factor vs. strain for frequencies of 10.75 and 29.125 Hz.

FIG. 6 shows the calculated values of gauge factor as a function of strain for the 10.75 Hz and 29.125 Hz. In the elastic region (strain below 0.5%), the peak at 29 Hz shows a much higher gauge factor. In the inelastic region (strain above 1%), the gauge factors at both frequencies are nearly equal and are relatively constant with the stress/strain level.

Figure 7:
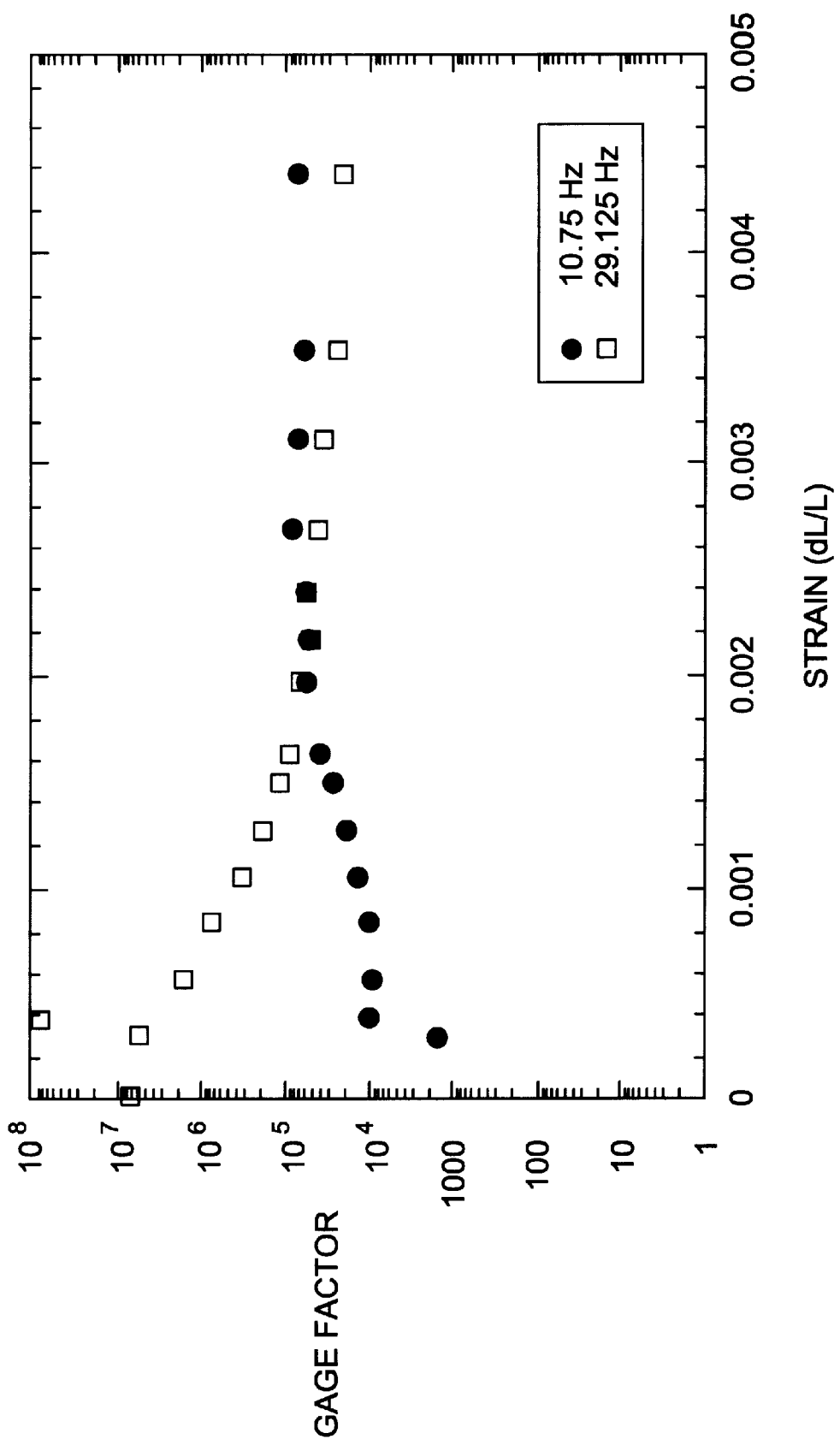
FIG. 7 is a graph of gauge factor vs. strain in the elastic region of nichrome wire for frequencies of 10.75 and 29.125 Hz.

FIG. 7 shows an expanded view of FIG. 6 in the low stress, elastic regime. Measuring stress/strain characterizations in that area is particularly difficult, but very high gauge factors make it possible.

Figure 8:
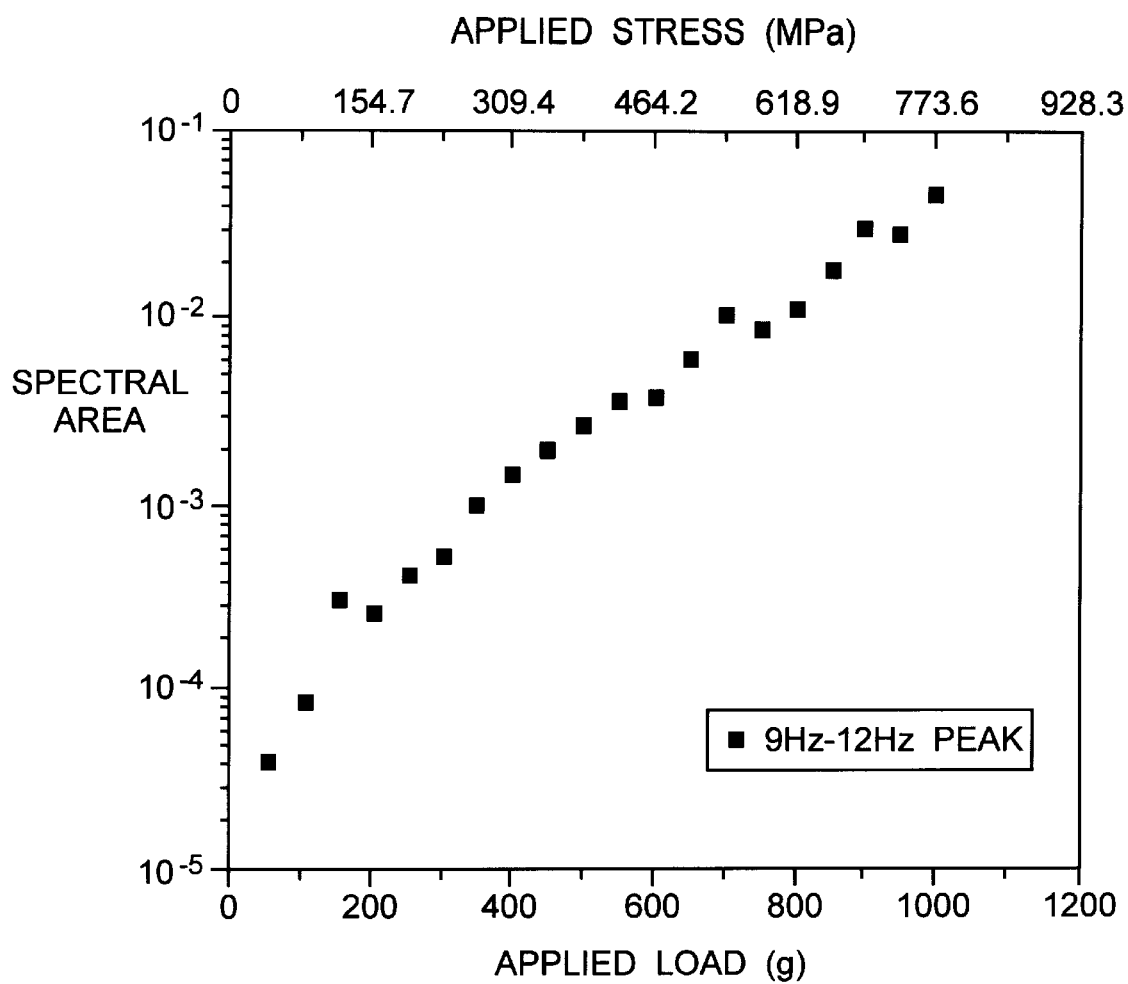
FIG. 8 is a graph of spectral area under the very first peak between 9 and 12 Hz vs. applied load.

As part of preliminary investigation of the stress induced signal, we analyzed some of the data to check its feasibility as a potential stress determination technique. FIG. 8 shows the spectral area under the very first peak between 9 Hz and 12 Hz as a function of applied stress to the sample. The plot clearly indicates a direct correlation between the peak area and applied stress. The plot also shows an exponential increase indicating larger sensitivity at higher stress levels.

Figure 9:
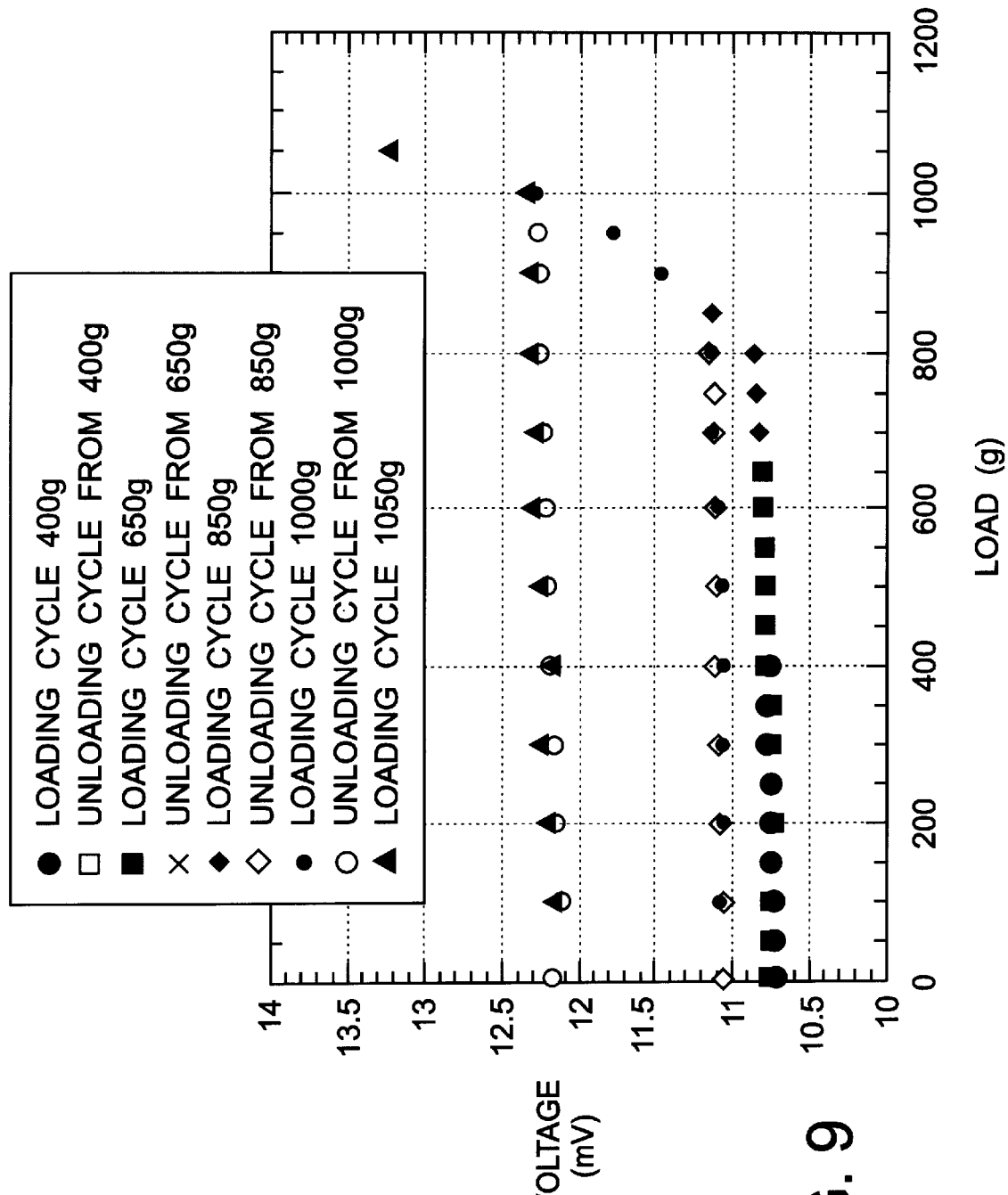
FIG. 9 is a graph of sample voltage vs. applied load for various stress loading and unloading cycles for NiCr wire sample.

Another important characteristic of a stress/strain gauge is repeatability of the signal. In that regard, the new measurement technique exhibits extremely promising behavior. FIG. 9 shows the measured voltage across a length of NiCr wire for various stress loading and unloading cycles. The measured voltage (or resistance) is reversible in the elastic region, between 400 and 650 g cycles. The measured voltage undergoes an irreversible hysteresis once exposed to loading that causes inelastic deformation.

Figure 10:
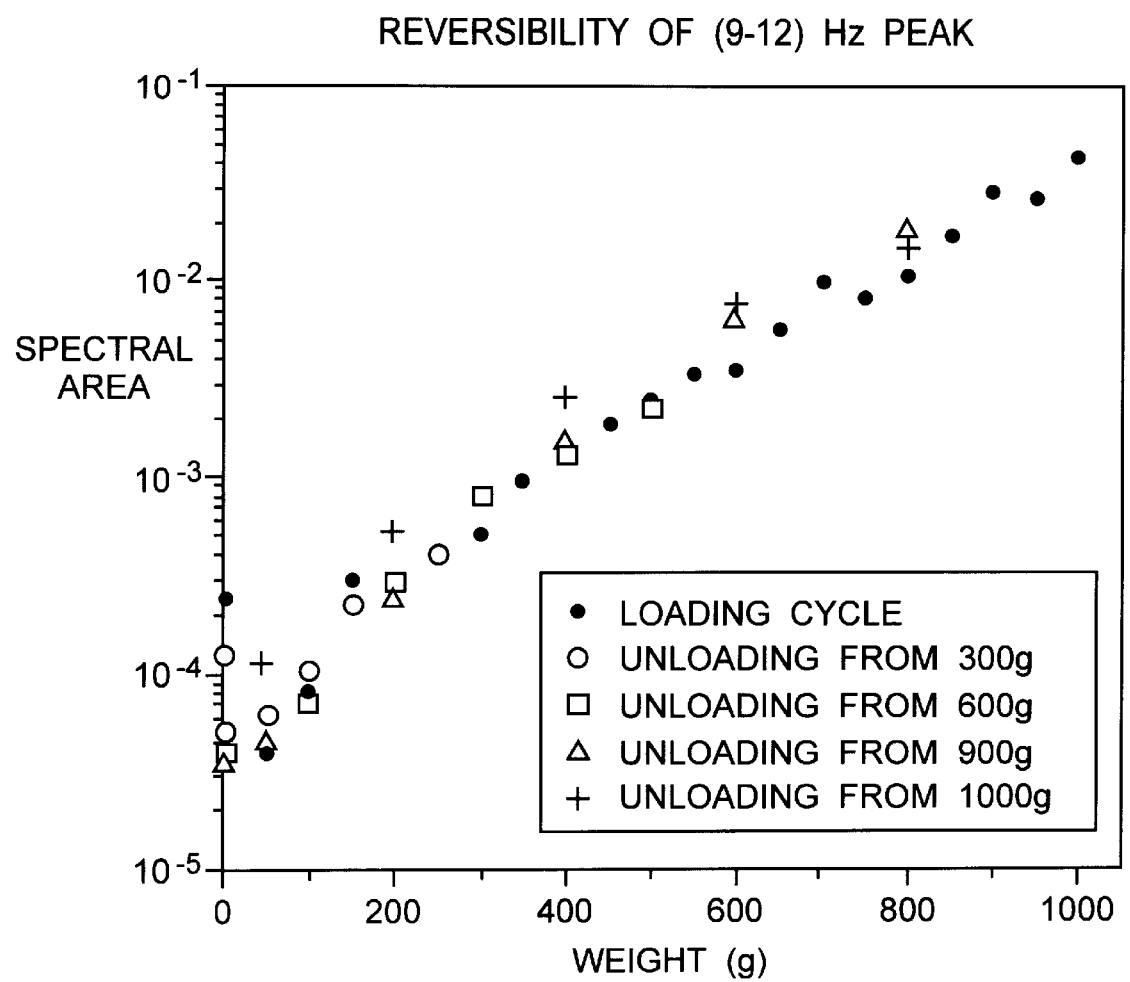
FIG. 10 is a graph of the spectral area vs. applied load for various stress loading and unloading cycles under the 9–12 Hz peak.

FIG. 10 shows the intensity of the voltage fluctuations, as characterized by the area under the 9–12 Hz peak, for cycles over the same range of loadings including those yielding inelastic deformation. Although there is some change in signal intensity after the sample undergoes inelastic deformation, the extremely steep dependence of the signal on stress/strain makes it possible to determine stress in a deformed sample. Similar behavior was observed for other frequencies as well.

Figure 11:
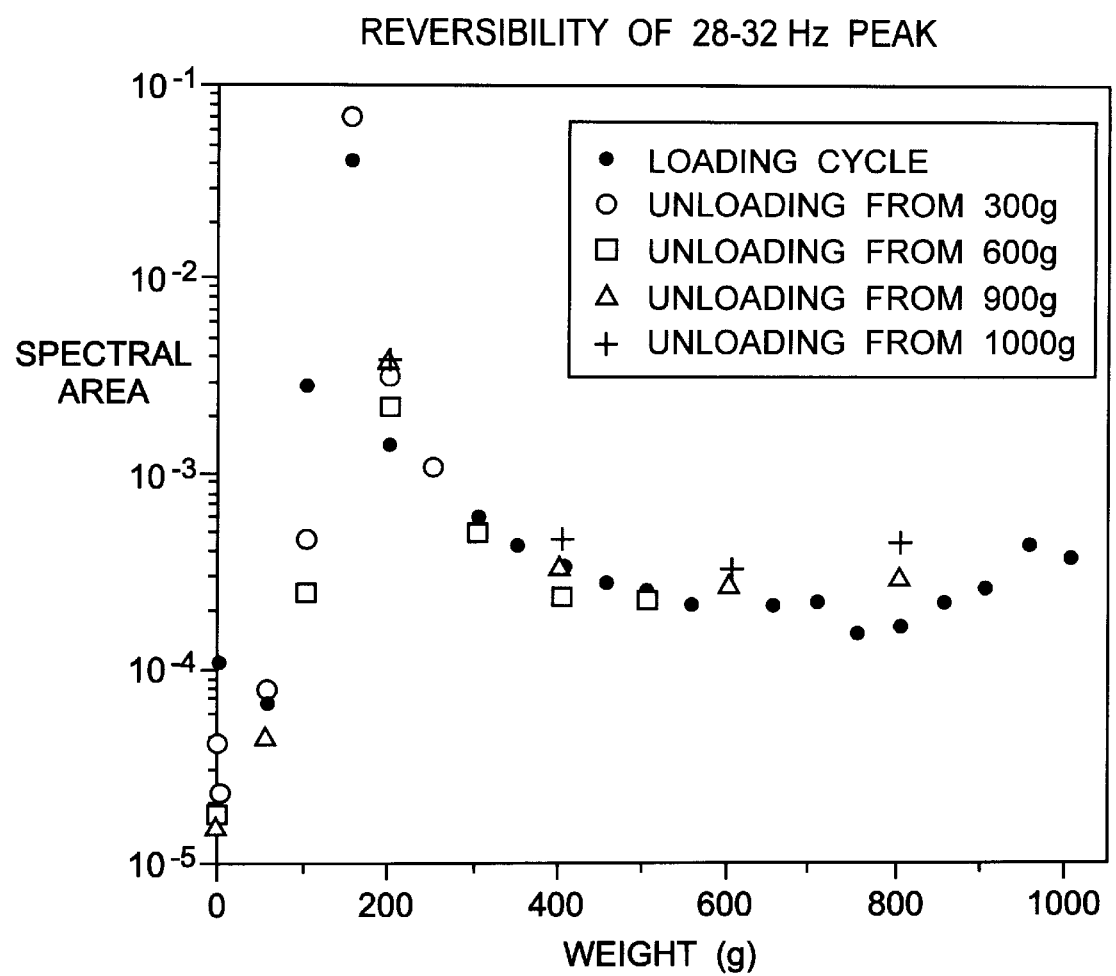
FIG. 11 is a graph of spectral area vs. applied load for various stress loading and unloading cycles under the 29 Hz peak.

FIG. 11 shows the area under 29 Hz peak for different loading cycles. Although the intensity of that peak becomes smaller above some critical stress value, the behavior is again found to be quite repeatable and shows relatively little hysteresis, even when cycled into the inelastic regime. Hence, the technique has two additional advantages. First, the technique may be used on damaged strain gauges that went through the inelastic region. Second, a wider range for stress detection is available, including levels exceeding the yield stress of the sensor.

The reversibility of the stress induced noise signal from inelastic region as shown in FIGS. 10 and 11 is one important aspect of the new phenomenon. The data indicates a new physical property which is reversible even after a sample has gone through an inelastic deformation. This behavior is normally not observed in other physical properties of materials such as sample voltage/resistance which is illustrated in FIG. 9.

A preferred embodiment is an in situ stress sensor for use in thin film processing. Most thin films show very high levels of stress. For example, stress levels are on the order of a few GPa in diamonds and diamond-like carbon films, and 200 to 600 MPa in a-SiN:H films. Detection of those high levels of stress using the new technique is very straight forward. The technique, which is capable of detecting even smaller levels of stress, is suitable for optimizing film processing and maintaining small stress levels.

Figure 12:
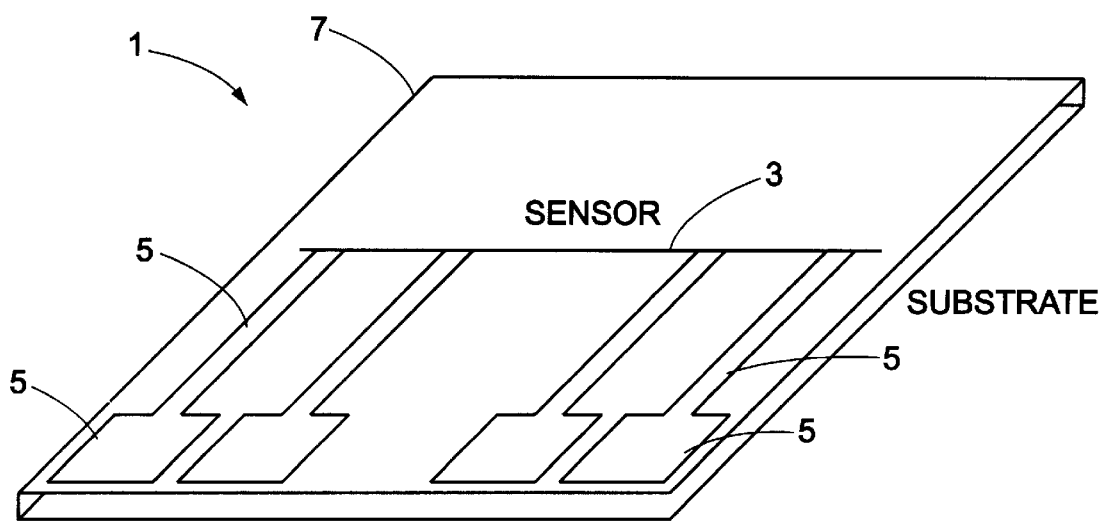
FIG. 12 is a schematic design of the in situ stress sensor.

The schematic design of the in situ stress sensor 1 is shown in FIG. 12. The preferred sensor simply consists of a conducting/resistive film 3 in a four probe 5 configuration on an insulating substrate 7. Such a sensor film 3 may preferably be made of aluminum, NiCr, Yb, Mn or any other conducting material. Simplicity of the sensor design offers mass production and easy replacement of the sensor with very low cost. The stress signal of the sensor material may be calibrated separately by applying a known external stress. The sensor may be mounted inside the vacuum deposition chamber by means of the electrical feed through. The non-conducting sample film (such as intrinsic-Si,SiC, SiN, $SiO_2$, GaAs, diamond, DLC, $Al_2O_3$ etc.) under investigation is preferably deposited directly on the sensor. The presence of any stress in the sample film causes an external stress to the sensing film that may be monitored throughout the film growth process.

For conducting or semiconducting films (such as Al, Cu, Au, Ag, Mo, Ni, NiOx, ITO, ZnO, doped Si, doped GaAs, AlN, CIS, carbon etc.) there are two possibilities of detecting stress. The first preferred possibility is to use another sensor material whose properties are well characterized, as discussed in the above paragraph. The sensor may be sealed by a stress free insulating film. For less sensitive applications, sample film may also preferably be deposited on the back side of the sensor substrate (thin), hence avoiding the insulating film.

The second preferred possibility is to use the sample film as the sensor itself. As the film grows between the four probe contacts, a simple model that relates the sample voltage to the film thickness and other film dimensions may be used to normalize the signal with variation in the film thickness and resistance. That approach has the significant advantage of detecting stress in the sample film in its original growth conditions. The stress signal calibration may be done using another sensor.

The strength of the above stress sensing technique may be further improved by using two identical sensors and depositing the sample on only one sensor. Using two sensors eliminates any changes in the background signal during the growth process.

Figure 13:
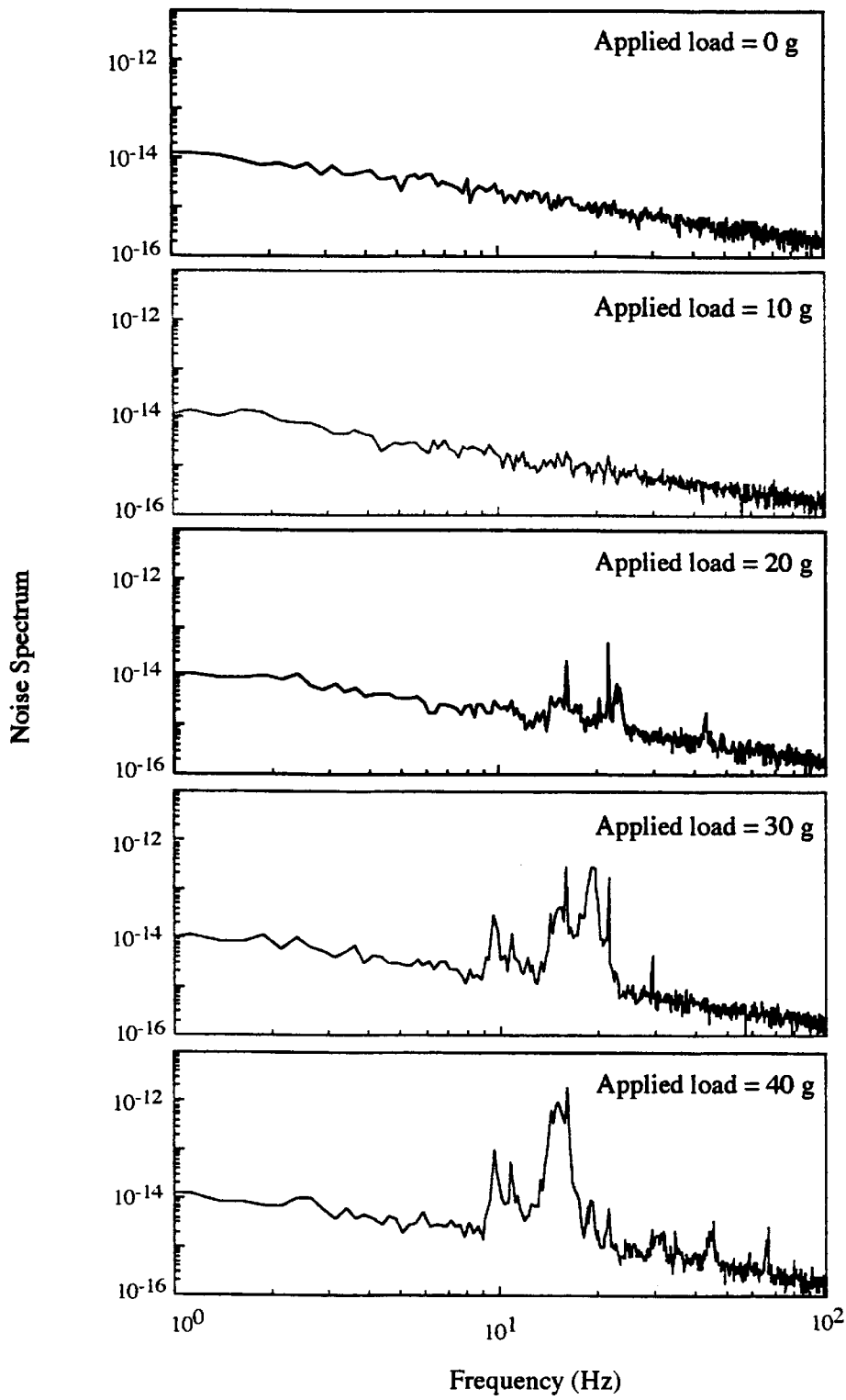
FIGS. 13A, 13B, 13C, 13D, 13E are graphs of spectral noise density vs. frequency for applied loads of 0, 10, 20, 30 and 40 grams, for a thin film of aluminum respectively.

The voltage fluctuation technique was also used for thin films of aluminum in order to show its feasibility for making thin film stress sensors. In FIGS. 13(*a*) to 13(*e*), the voltage fluctuation is plotted as a function of frequency for above thin films of aluminum for various mass applied to the substrate. FIG. 13(*a*) corresponds to the case when there is no external stress applied to the sample. The plot shows the background signal. FIGS. 13(*b*) to 13(*e*) show the development of stress induced signals between 10 Hz and 50 Hz. The plots also show the direct correspondence between the magnitude of the stress induced peaks and amount of external stress applied to the sample.

The following exemplifies the major advantages of the new stress detection technique over the existing methods of stress detection in the thin film industry.

The present invention is fast. The current electronic voltage-fluctuation measurement setup collects one set of data in eight seconds. An average of a few data sets may be done to minimize other random noises. The measurements may be made even faster by using a faster digitizer and math processor.

The technique is orders of magnitude more sensitive than any other existing method. The stress induced electronic signal is very sensitive to applied stress, easily producing response to background ratio of 26,000, even within the elastic limits of the sample.

Use of the present invention is simple. The technique requires simple monitoring of voltage fluctuations in a sensor/sample film. The sensor may be made of a variety of materials and in mass production with low cost. The experimental set up is also simple.

The present invention allows for in situ measurement. In situ stress measurement is a novel technique that may be accomplished during normal film growth conditions with very little modification to existing deposition systems.

The present invention is useful for complex devices. Unlike traditional optical methods that require perfect films and substrates, electronic detection technique is not limited by the sample shape and size. It has the potential to detect stress in complex thin film devices. That is one of the important features of the technique over the optical stress detection technique, which is incapable of detecting stress in the patterned films.

The present invention is a non destructive testing method. The measurements are done by passing a small amount of current through the sensor/sample and observing voltage fluctuations. Hence, the technique is completely non-destructive.

The present invention is useful for a wide range of sample sizes. The measurements may be done on samples of various sizes. The only limitation is the distance between the two voltage leads. Electronic voltage noise has been measured in small superconducting single crystals of $YBa_2Cu_3O_7$ that are about 1 mm in size, and on wires of up to several centimeters in length. That opens the feasibility of making several micro sensors on one substrate and performing a stress-mapping.

The present invention may be used over a wide temperature range. Electronic voltage noise has been measured over a wide range of temperatures. Since temperature plays an important role in defining film properties, it is specially required to detect stress at various sample temperatures. The new electronic technique is capable of performing measurements at various temperatures and does not need any sensor cooling.

The present invention provides simultaneous resistance measurements. Electronic voltage fluctuation is measured using a four-probe method. Sample voltage and current through the sample are accurately monitored during the experiment using the same four probe contact. Hence, the new technique has all the advantages of conventional piezoresistive measurement technique.

Figure 14:
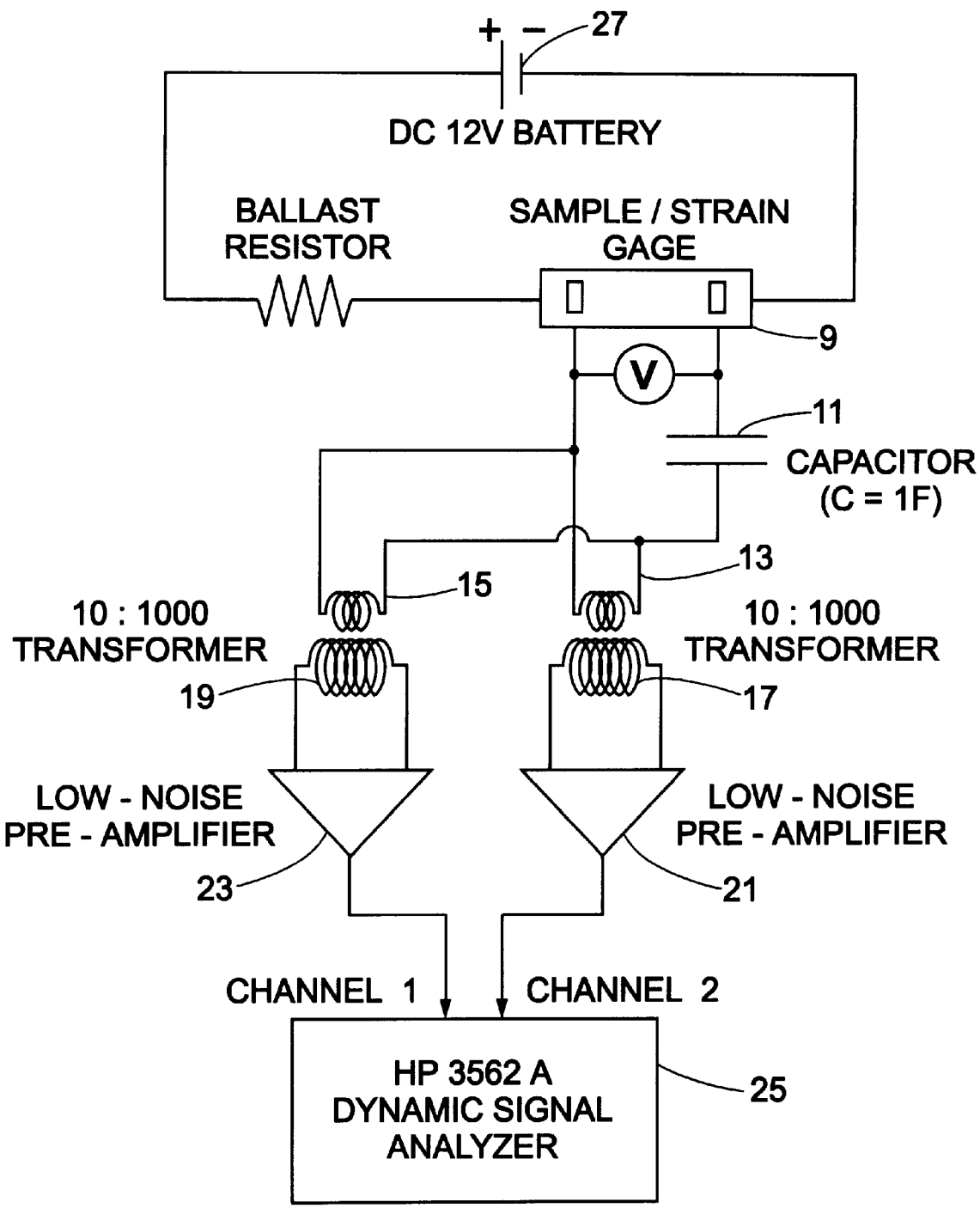
FIG. 14 is a circuit diagram for measuring electrical noise.

The present invention is low cost. The preferred setup for the technique, as shown in FIG. 14, requires simple apparatus like a battery 27, capacitor 11, preamplifier 21 and 23, signal analyzer 25 and a personal computer. One may build a low cost, fast signal analyzer with limited frequency range for the specific purpose of stress measurement that requires a two-channel digitizer, FFT and math processor. The cost of the sensor and operation is negligible.

The electrical noise spectrum used for detection of stress/strain is measured by a DC four-probe cross-correlation method. FIG. 14 shows the circuit diagram for that method. In a four-probe method, the two outer probes are used for passing the current and the two inner probes are used for measuring the voltage. That arrangement greatly reduces any effects from the contact resistance. The voltage across the sample 9 is DC filtered through a large capacitor 11. The signal is then split into two parallel branches 13 and 15, providing identical sources for the cross correlation measurement. In each branch, the signal is amplified by feeding it into a transformer 17 and 19 and then into a preamplifier 21 and 23. Finally the cross-correlation spectrum is measured by an HP3562A dynamic signal analyzer 25, which detects signals from the two preamplifiers 21 and 23. The cross correlation technique effectively reduces the noise background generated by the preamplifiers 21 and 23 since the two noise sources from the preamplifier circuits are not correlated and only the noise signal from the sample is preserved in the averaging process.

For stress/strain measurements, the entire system described above may be replaced with a simple lock-in amplifier that records the signal corresponding to a chosen response frequency. The behavior of the sensing material may be measured beforehand, yielding a calibration that may then be used to convert the signal to the amount of stress/strain.

While the invention has been described with reference to specific embodiments, modifications and variations of the invention may be constructed without departing from the scope of the invention, which is defined in the following claims.

We claim:

1. A stress/strain sensor apparatus for testing a sample material for stress and resulting strain, said apparatus comprising an insulating substrate coupled to the sample material, a sensing film coupled to the substrate, contacts on the sensing film, a power source for supplying current to the contacts, at least one connector connecting the power source to the sensing film contacts, and a detector communicating with the sensing film for measuring a first stress-induced electronic noise in the sensing film at a known stress level, measuring a second stress-induced electronic noise at an unknown stress level and comparing said first and second stress-induced electronic noises to determine the unknown stress in the sensing film.

2. The apparatus of claim 1, wherein the detector comprises a lock-in-amplifier connected to the contacts and a recorder connected to the lock-in-amplifier for recording signals corresponding to chosen noise frequencies.

3. A stress/strain sensor apparatus for testing a sample material for stress, comprising an insulating substrate coupled to the sample material, a sensing film coupled to the substrate, two outer contact probes and two inner contact probes connected to the sensing film, a battery and a current limiting resistor connected to the two outer probes for supplying current to the two outer probes, a detector connected to the two inner contact probes for measuring stress-induced electronic voltage fluctuation in the sensing film, a capacitor for filtering DC voltages from the voltage fluctuations measured on the two inner probes and a splitter for splitting the voltage fluctuations into two parallel branches.

4. The apparatus of claim 1, wherein the detector comprises a transformer connected to the contacts, a preamplifier connected to the transformer and a signal analyzer connected to the transformer.

5. The apparatus of claim 1, further comprising a capacitor connected between the contacts and the detector.

6. The apparatus of claim 1, wherein the detector comprises first and second transformers connected to the contacts, first and second preamplifiers connected respectively to the first and second transformers, and a signal analyzer connected to the first and second transformers.

7. The apparatus of claim 1, wherein the first and second stress-induced electronic noises are low frequency voltage noise.

8. The apparatus of claim 1, wherein the sensing film is selected from a group consisting of nickel chromium, ytterbium, and manganese.

9. A stress/strain sensing method comprising providing an insulating substrate on a material to be tested, supplying a sensing film on the substrate in a four probe configuration and providing two outer probes for passing current and two inner probes for the measuring of the voltage fluctuations, supplying current to the two outer probes from a battery and a current limiting resistor, filtering DC voltages from the voltage fluctuations on the two inner probes by a capacitor, splitting the voltage fluctuations from the capacitor into two parallel branches and measuring stress-induced electronic voltage fluctuation signals in the sensing material.

10. A stress/strain sensor apparatus for testing a sample material under stress comprising, two outer and two inner probes connected to the sample material, a battery and a current limiting resistor connected to the two outer contact probes for supplying current to the outer contact probes, a detector connected to the two inner contact probes for measuring stress-induced voltage fluctuation signals in the sample under stress, a capacitor for filtering DC voltages from the voltage fluctuations measured on the two inner probes and a splitter for splitting the voltage fluctuations into two parallel branches.

11. A stress/strain sensing method comprising coupling an insulating substrate to a material to be tested for stress and resulting strain, supplying a sensing film coupled to the substrate, and measuring a first stress-induced electronic noise at a known stress level, measuring a second stress-induced electronic noise at an unknown stress level and comparing said first and second stress-induced electronic noises to determine stress in the sensing material.

12. The apparatus of claim 6, further comprising a capacitor for filtering DC voltages from the noise.

13. A stress/strain sensor apparatus comprising a sample material under stress, contacts on the sample material, a power source for supplying current to the contacts, a connector for connecting the power source to the contacts, and a detector connected to the contacts for measuring a first stress-induced noise signal in the sample at a known stress level, measuring a second stress-induced noise signal in the sample at an unknown stress level and comparing said first and second noise signals to determine stress in the sample material.

14. The apparatus of claim 3, further comprising a transformer in each branch for stepping up the voltage fluctuations from the capacitor.

15. The apparatus of claim 3, further comprising a preamplifier connected to the transformer in each branch for amplifying the stepped up voltage fluctuations from each transformer.

16. The apparatus of claim 15, further comprising a spectrum analyzer for comparing and measuring the concurrent voltage fluctuations from each preamplifier and for removing non-concurrent preamplifier noise.

17. The method of claim 11, wherein the measuring first and second electronic noises comprises measuring first and second low frequency noises.

18. The method of claim 11, wherein supplying the sensing film comprises supplying the sensing film selected from a group consisting of nickel chromium, ytterbium, and manganese.

19. The method of claim 11, further comprising filtering DC voltages from the noises with a capacitor.

20. The method of claim 9, further comprising stepping up the voltage fluctuations in each branch by transformers.

21. The method of claim 20, further comprising amplifying the voltage fluctuations from each transformer by preamplifiers.

22. The method of claim 20, further comprising analyzing the voltage fluctuations from the preamplifiers by a spectrum analyzer.

23. The method of claim 11, further comprising recording the noise corresponding to chosen response frequencies with a lock-in-amplifier and recorder.

24. The apparatus of claim 13, wherein the detector comprises a lock-in-amplifier connected to the contacts and a recorder connected to the lock-in-amplifier for recording signals corresponding to chosen frequencies.

25. The apparatus of claim 13, wherein the detector comprises a transformer connected to the contacts, a preamplifier connected to the transformer and a signal analyzer connected to the transformer.

26. The apparatus of claim 13, further comprising a capacitor connected between the contacts and the detector.

27. The apparatus of claim 13, wherein the detector comprises first and second transformers connected to the contacts, first and second preamplifiers connected respectively to the first and second transformers, and a signal analyzer connected to the first and second transformers.

28. The apparatus of claim 13, wherein the stress-induced noise signals are low frequency voltage fluctuations.

29. The apparatus of claim 28, further comprising a capacitor for filtering DC voltages from the stress induced noise.

30. The apparatus of claim 10, further comprising a transformer in each branch for stepping up the voltage fluctuations from the capacitor.

31. The apparatus of claim 30, further comprising a preamplifier connected to the transformer in each branch for amplifying the stepped up voltage fluctuations from each transformer.

32. The apparatus of claim 30, further comprising a spectrum analyzer for comparing and measuring the concurrent voltage fluctuations from each preamplifier and for removing non-concurrent preamplifier noise.

33. The apparatus of claim 28, wherein the detector further comprises a lock-in-amplifier and recorder for recording the noise corresponding to a chosen response frequency.

* * * * *